United States Patent [19]

Horng et al.

[11] Patent Number: 5,499,058
[45] Date of Patent: Mar. 12, 1996

[54] DIGITAL COLOR ENCODER USING TRIANGULAR WAVE MODULATION

[75] Inventors: Chun-Hsien Horng, Taipei; Guang-Nan Tzeng, Taichung, both of Taiwan

[73] Assignee: Industrial Technology Research Institute, Hsinchu, Taiwan

[21] Appl. No.: 394,589

[22] Filed: Feb. 27, 1995

[51] Int. Cl.⁶ .................................................... H04N 9/65
[52] U.S. Cl. ......................... 348/642; 348/488; 348/660; 348/724
[58] Field of Search ........................... 348/488, 630, 348/642, 660, 724; H04N 9/64, 9/65

[56] References Cited

U.S. PATENT DOCUMENTS

| | | | |
|---|---|---|---|
| 4,355,327 | 10/1982 | Nagumo et al. | 358/44 |
| 4,686,520 | 8/1982 | Yamaoka | 348/642 |
| 4,956,701 | 9/1990 | Shioda | 358/11 |
| 4,982,179 | 1/1991 | Ogawa et al. | 348/642 |
| 5,008,740 | 4/1991 | Phillips et al. | 358/23 |
| 5,301,015 | 4/1994 | Kim | 348/493 |

Primary Examiner—Victor R. Kostak
Assistant Examiner—Juan Gabriel Acosta
Attorney, Agent, or Firm—George O. Saile; Larry Prescott

[57] ABSTRACT

This invention provides a digital color encoder for digitizing color video signals. The encoder forms a digitized color video signal using logic function processing of the digitized luminance signal and color difference signals. The encoder provides an output signal equivalent to the luminance signal added to the color difference signals modulated by triangular wave functions and sampled at the sampling frequency. The sampling frequency is eight times the crominance subcarrier frequency. An analog video signal can easily be recovered from the digital video signal because the fundamental frequency of the triangular wave is easily separated from the higher order harmonics.

14 Claims, 7 Drawing Sheets

DIGITAL COLOR ENCODER USING TRIANGULAR WAVE MODULATION

BACKGROUND OF THE INVENTION

(1) Field of the Invention

This invention relates to a digital color encoder for digital handling and processing of color video signals. The encoder uses generally available luminance and color difference signals to form a digitally encoded color video signal.

(2) Description of Related Art

A number of patents have dealt with the problem of digitally encoding color video signals. U.S. Pat. No. 4,355,327 to Nagumo et al and U.S. Pat. No. 4,686,520 to Yamaoka use a three phase sin wave modulation for encoding color video signals. U.S. Pat. No. 5,008,740 to Phillips et al provides methods for encoding digital video components. U.S. Pat. No. 4,965,701 to Shioda and U.S. Pat. No. 5,301,015 to Kim deal with methods for handling and processing digital video signals.

This invention provides a method and apparatus for digital encoding of color video signals using triangular wave modulation. Triangular modulation is much more direct than other types of modulation and is implemented using logic functions. Triangular wave modulation is particularly convenient because the Fourier representation of the triangular wave is such that the fundamental frequency terms can be easily separated from the higher order harmonics.

SUMMARY OF THE INVENTION

It is a principal objective of this invention to provide a digital color encoder which will directly provide the digital color signal from the luminance signal, the first color difference signal, and the second color difference signal. The luminance signal is formed from the red, green, and blue primary color signals according to the equation $Y=0.299 R+0.587 G+0.114 B$. In this equation Y is the luminance signal, R the red primary color signal, G the green primary color signal, and B the blue primary color signal. The first color difference signal, U, and second color difference signal, V, are formed according to the equations $U=(R-Y)/1.14$ and $V=(B-Y)/2.03$.

This objective is achieved with a circuit which has a digital color encoded output having a carrier period, $T_o$, made up of eight sampling periods. The carrier period is equal to the inverse of the crominance subcarrier frequency, $f_o$. The sampling frequency, $f_1$, is the inverse of the sampling period and is eight times the subcarrier frequency. The luminance signal, Y, the first color difference signal, U, and the second color difference signal, V, are sampled at the sampling frequency and quantized into digital signals. The digital color encoded output is equal to $Y+U$, during the first sampling period of each carrier period, $Y+(\frac{1}{2})\times U+(\frac{1}{2})\times V$ during the second sampling period of each carrier period, $Y+V$ during the third sampling period of each carrier period, $Y-(\frac{1}{2})\times U+(\frac{1}{2})\times V$ during the fourth sampling period of each carrier period, $Y-U$ during the fifth sampling period of each carrier period, $Y-(\frac{1}{2})\times U-(\frac{1}{2})\times V$ during the sixth sampling period of each carrier period, $Y-V$ during the seventh sampling period of each carrier period, and $Y+(\frac{1}{2})\times U-(\frac{1}{2})\times V$ during the eighth sampling period of each carrier period.

FIG. 1 shows two triangular waveforms $g_1(t)$ 10 and $g_2(t)$ 12, each waveform having a period 14 equal to the carrier period $T_o$ and varying between the extreme values of 1 and −1. The first triangular waveform $g_1(t)$ varies from a value of 1 at $t=0$, to ½ at $t=T_o/8$, to 0 at $t=T_o/4$, to −½ at $t=3T_o/8$, to −1 at $t=T_o/2$, to −½ at $t=5T_o/8$, to 0 at $t=3T_o/4$, to ½ at $t=7T_o/8$, and back to 1 at $t=T_o$. The second triangular waveform $g_2(t)$ varies from a value of 0 at $t=0$, to ½ at $t=T_o/8$, to 1 at $t=T_o/4$, to ½ at $t=3T_o/8$, to 0 at $t=T_o/2$, to −½ at $t=5T_o/8$, to −1 at $t=3T_o/4$, to −½ at $t=7T_o/8$, and back to 0 at $t=T_o$. It can be seen from the above that the digital color encoded output of this invention is the same as if the signal formed by $E(t)=Y+U\times g_1(t)+V\times g_2(t)$ were sampled at the sampling frequency.

In a television color signal the luminance signal is added to the first and second color difference signals modulated at the crominance subcarrier frequency $f_o$ so that the signal is given by $E(t)=Y+U\cos(2\pi f_o t)+V\sin(2\pi f_o t)$. The digital color encoded output signal of this invention is the quantized digital signal corresponding to $E(t)=Y+U\times g_1(t)+V\times g_2(t)$ with the sampling frequency equal to eight times the crominance subcarrier frequency $f_o$. The Fourier series representing $g_1(t)$ is equal to $A_1 \cos(2\pi f_o t)+A_3 \cos(6\pi f_o t)+$higher order odd harmonics. The Fourier series representing $g_2(t)$ is equal to $B_1 \sin(2\pi f_o t)+B_3 \sin(6\pi f_o t)+$higher order odd harmonics. During the conversion of the digital color encoded output from a digital to an analog signal the fundamental frequency is retained and the higher order harmonics are eliminated. The resulting signal is $E(t)=Y+U\cos(2\pi f_o t)+V\sin(2\pi f_o t)$ which is the desired color television signal.

This invention provides a very direct method of obtaining the coefficients for the digital color encoded signal without the need for calculation. The digitized luminance color difference signals are supplied directly to the digital color encoder.

DESCRIPTION OF THE PREFERRED EMBODIMENTS

Figure 2A:
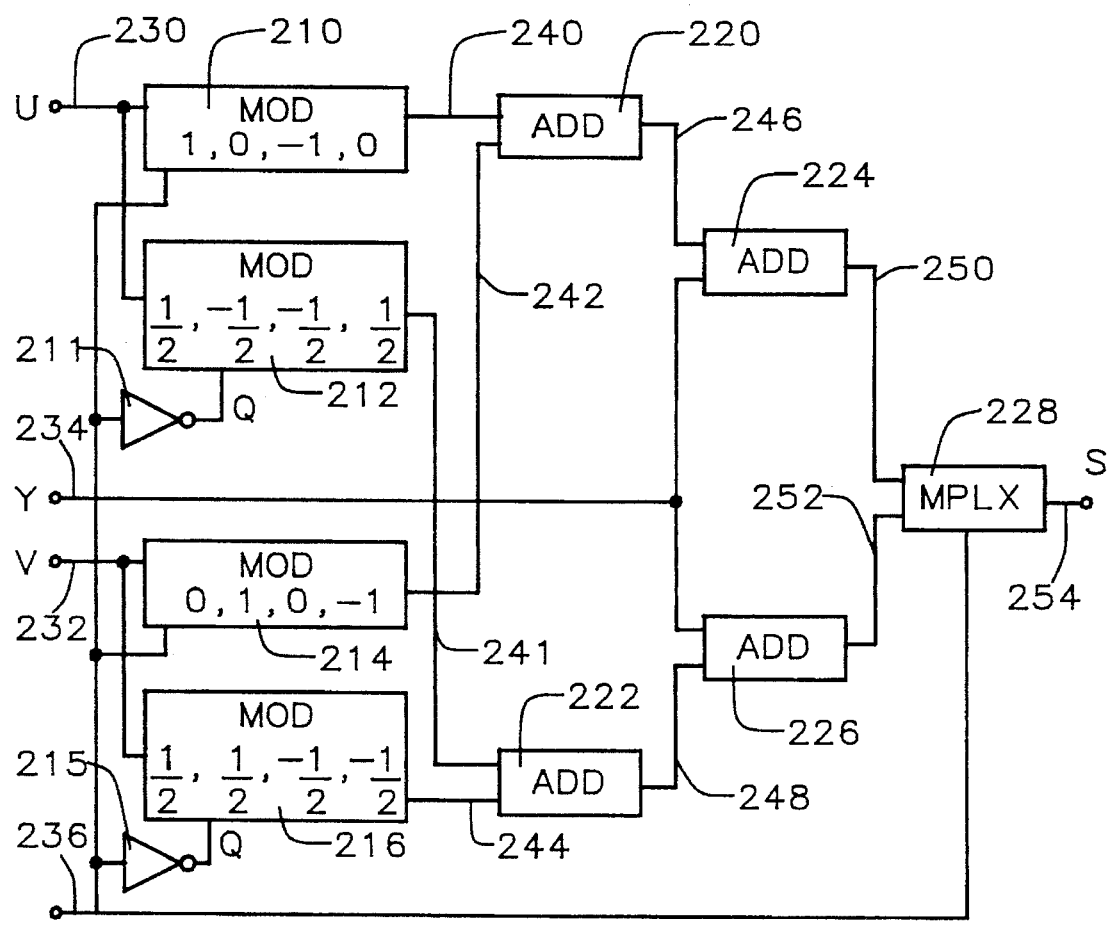
FIG. 2A is the block diagram of the first digital color encoder.

Refer now to FIGS. 2A through FIG. 5C, there is shown the preferred embodiment of the invention. FIG. 2A shows a block diagram of an embodiment of the digital color encoder of this invention. The luminance signal, Y, is formed from the blue primary color signal, B, the red primary color signal, R, and the green primary color signal, G, according to the equation Y=0.299 R+0.587 G+0.114 B. A first color difference signal, U, and a second color difference signal, V, are formed from the luminance signal and the red, green, and blue primary color signals according to the equations U=(R−Y)/1.14 and V=(B −Y)/2.03. The desired video signal, E(t), is given by the equation $E(t)=Y+U \cos(2\pi f_o t)+V \sin(2\pi f_o t)$. In this last equation $f_o$ is the chrominance subcarrier frequency and is about 3.579545 MHz. A carrier period, $T_o$, is defined to be $1/f_o$.

In this embodiment the luminance signal, the first color difference signal, and the second color difference signal are sampled at a sampling frequency $f_1$ and quantized. The sampling frequency is eight times the carrier frequency. A sampling period, $T_1$, is defined to be $1/f_1$. Each carrier period is made up of eight sampling periods.

Refer now to FIG. 2A, there is shown the quantized color difference signals at the inputs of a first digital modulator circuit 210, a second digital modulator circuit 212, a third digital modulator circuit 214, and a fourth digital modulator circuit 216. A control input signal 236 is connected directly to the timing inputs of the first digital modulator circuit 210 and the third digital modulator circuit 214. The control input signal 236 is connected to the timing input of the second digital modulator circuit 212 through a first inverter 211 and to the timing input of the fourth digital modulator circuit 216 through an second inverter 215. The first inverter 211 and second inverter 215 are identical and convert a logical 1 signal to a logical 0 signal and a logical 0 signal to a logical 1 signal. The control input signal 236 is shown by waveform 25 in FIG. 2B and is a logical 1 during the first, third, fifth, and seventh sampling period of each carrier period and a logical 0 during the second, fourth, sixth, and eighth sampling period of each carrier period.

Figure 2B:
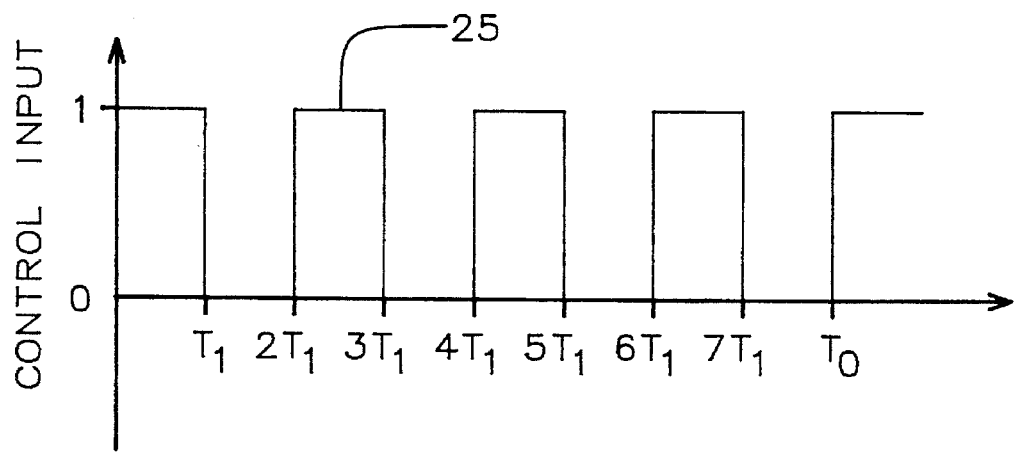
FIG. 2B is the waveform of the control signal for the first digital color encoder.
Figure 3A:
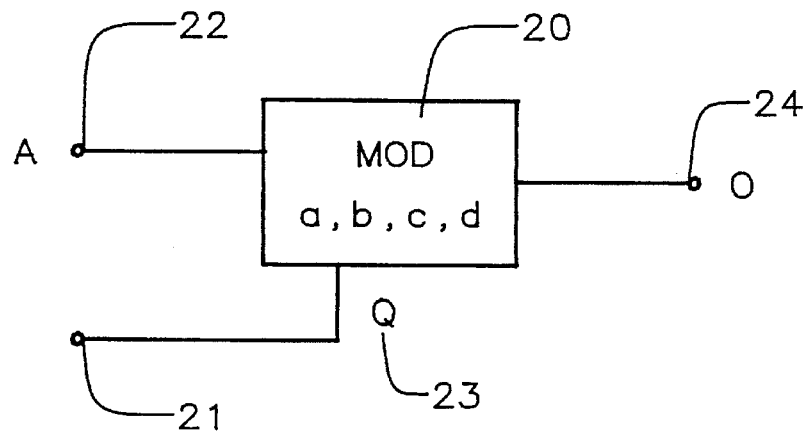
FIG. 3A is the block diagram of the digital modulator circuit with the control input connected directly to the timing input.
Figure 3B:
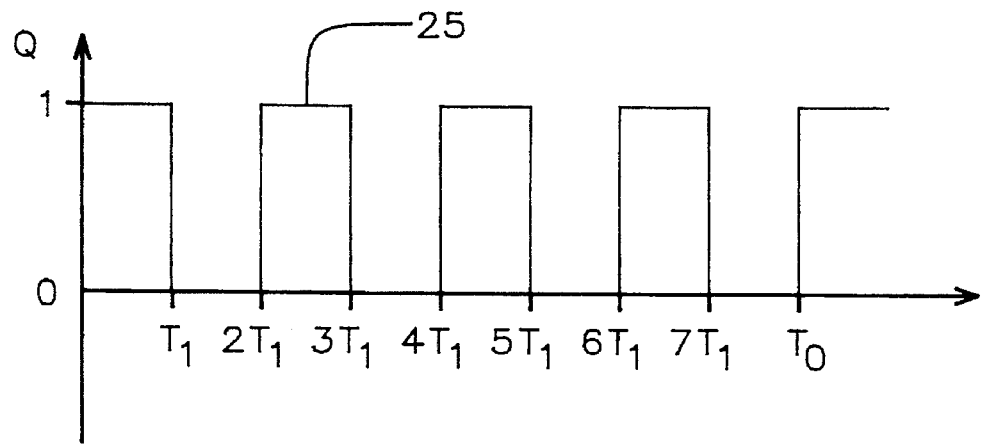
FIG. 3B is the waveform of the timing input for the digital modulator circuit with the control input connected directly to the timing input.
Figure 3C:
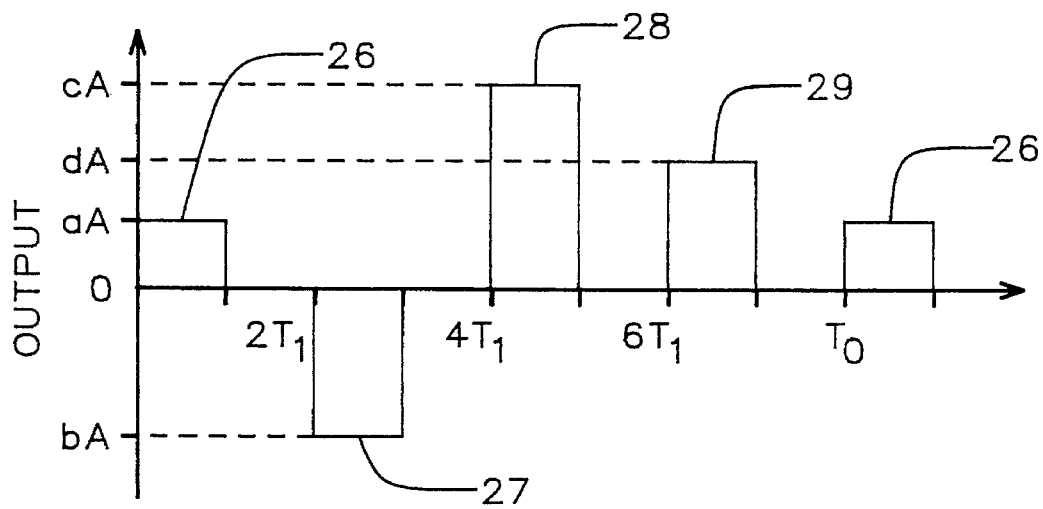
FIG. 3C is the waveform of the output signal of the digital modulator circuit with the control input connected directly to the timing input.

The operation of digital modulator circuits having modulation parameters a, b, c, and d and the control input signal connected directly to the timing input of the digital modulator circuit is shown in FIG. 3A, FIG. 3B, and FIG. 3C. As shown in FIG. 3A the digital modulator circuit 20 has a signal input A 22, a timing input 23, and an output signal 24. The timing input 23, shown in FIG. 3B, is the same as the control input 21, shown in FIG. 2B. The timing input 23, as shown by the waveform 25 in FIG. 3B, is a logical 1 during the first, third, fifth, and seventh sampling period of each carrier period and a logical 0 during the second, fourth, sixth, and eighth sampling period of each carrier period. When the timing input 23 first switches from logical 0 to logical 1 the output signal 24 is given by the input signal 22 multiplied by the first modulation parameter, in this case a. When the timing input 23 returns to logical 0 the output signal 24 is zero. The second time the timing input 23 switches from logical 0 to logical 1 the output signal 24 is given by the input signal 22 multiplied by the next modulation parameter, in this case b. When the timing input 23 returns to logical 0 the output signal 24 is zero. The third time the timing input 23 switches from logical 0 to logical 1 the output signal 24 is given by the input signal 22 multiplied by the next modulation parameter, in this case c. When the timing input 23 returns to logical 0 the output signal 24 is zero. The fourth time the timing input 23 switches from logical 0 to logical 1 the output signal 24 is given by the input signal 22 multiplied by the next modulation parameter, in this case d. When the timing input 23 returns to logical 0 the output signal 24 is zero. The cycle then begins again. FIG. 3B and FIG. 3C show the timing relationship between the timing input 23 and the output signal. As shown in FIG. 3C the output signal is a×A, 26, during the first sampling period of each carrier period; b× A, 27, during the third sampling period of each carrier period; c×A, 28, during the fifth sampling period of each carrier period; d×A, 29, during the seventh sampling period of each carrier period; and zero during the second, fourth, sixth, and eighth sampling period of each carrier period.

Figure 3D:
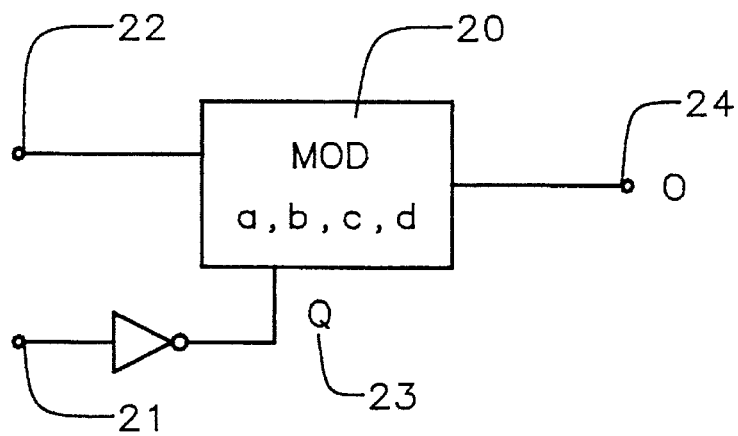
FIG. 3D is the block diagram of the digital modulator circuit with the control input connected to the timing input through an inverter.
Figure 3E:
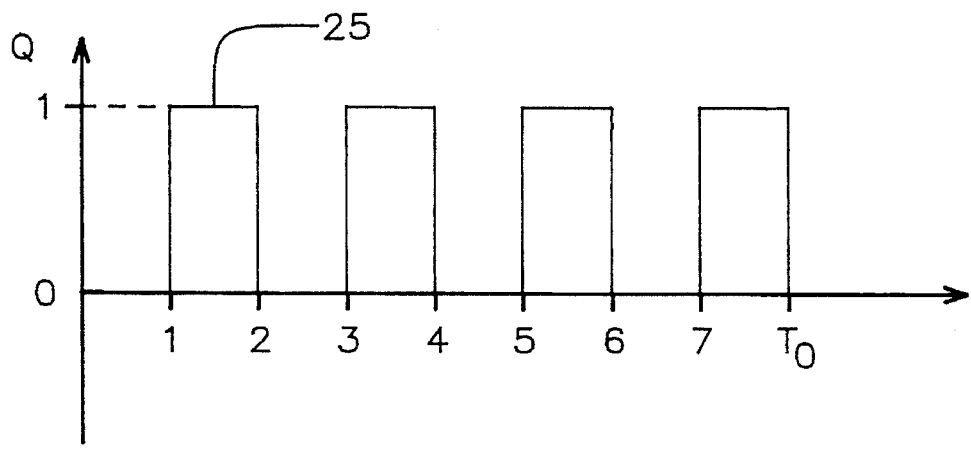
FIG. 3E is the waveform of the timing input for the digital modulator circuit with the control input connected to the timing input through an inverter.
Figure 3F:
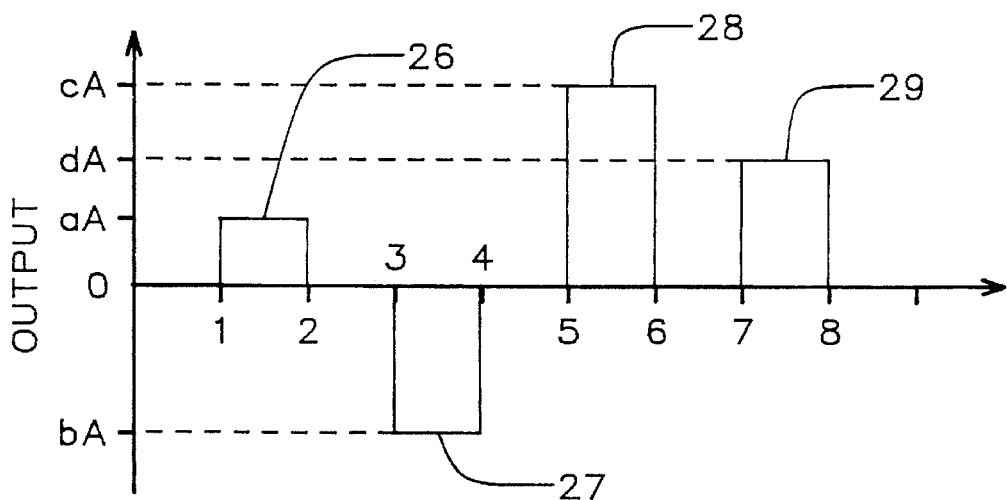
FIG. 3F is the waveform of the output signal of the digital modulator circuit with the control input connected to the timing input through an inverter.

The operation of digital modulator circuits having modulation parameters a, b, c, and d and the control input signal connected to the timing input of the digital modulator circuit through an inverter is shown in FIG. 3D, FIG. 3E, and FIG. 3F. The operation is as described in the preceding paragraph but in this case the timing input 23 is the control input 21 inverted. This timing input 23, which is the control input 21 inverted, is shown by the waveform 25 in FIG. 3E and is a logical 0 during the first, third, fifth, and seventh sampling period of each carrier period and a logical 1 during the second, fourth, sixth, and eighth sampling period of each carrier period. The timing relationship between the timing input 23 and the output signal 24 is shown in FIG. 3D and FIG. 3F. As shown in FIG. 3F the output signal is a×A, 26, during the second sampling period of each carrier period; b×A, 27, during the fourth sampling period of each carrier period; c×A, 28, during the sixth sampling period of each carrier period; d×A, 29, during the eighth sampling period of each carrier period; and zero during the first, third, fifth, and seventh sampling period of each carrier period.

As shown in FIG. 2A the input 230 to the first digital modulator circuit 210 with modulation parameters 1, 0, −1, 0 is the quantized first color difference signal. The control signal 236 input to the first digital modulator circuit 210 is shown in FIG. 2B and is logical 1 during the first, third, fifth, and seventh sampling period of each carrier period and logical 0 during the second, fourth, sixth, and eighth sampling period of each carrier period. The output 240 of the first digital modulator circuit 210 is the first intermediate signal and is equal to the quantized first color difference signal, U, during the first sampling period of each carrier period, the negative of the first color difference signal, −U, during the fifth sampling period of each carrier period, and 0 during the second, third, fourth, sixth, seventh, and eighth sampling periods of each carrier period. Hereinafter the first intermediate signal will be represented as U×{1, 0, 0, 0, −1, 0, 0, 0}. In this representation the signal in each of the eight sample periods of each carrier period is equal to the value outside the brackets multiplied by the eight elements within the brackets corresponding the eight sample periods in each carrier period.

Again referring to FIG. 2A the input 230 to the second digital modulator circuit 212 with modulation parameters ½, −½, −½, and ½ is the quantized first color difference signal, U. The output 241 of the second digital modulator circuit 212 is the second intermediate signal and is equal to U×{0, ½, 0, −½, 0, −½, 0, ½}. The quantized second color difference signal 232 is the input to both the third digital modulator circuit 214 with modulation parameters 0, 1, 0, −1 and the fourth digital modulator circuit 216 with modulation parameters ½, ½, −½, −½. The output 242 of the third digital modulator circuit 214 is the third intermediate signal and is given by V×{0, 0, 1, 0, 0, 0, −1, 0}. The output 244 of the fourth digital modulator circuit 216 is the fourth intermediate signal and is given by V×{0, ½, 0, ½, 0, −½, 0, −½}.

Figure 4:
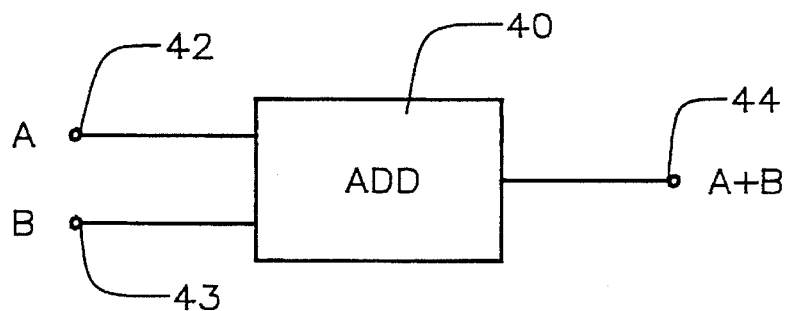
FIG. 4 is the block diagram of the digital adder.

Next as shown in FIG. 2A, four digital adder circuits are used. The operation of the digital adder circuit is shown in FIG. 4 where the output signal 44 is the sum of the input signals 42, 43. As shown in FIG. 2A the digital adder circuits are used to add the quantized luminance signal 234, the first intermediate signal 240, and the third intermediate signal 242 to form the fifth intermediate signal 250 which is equal to Y+U×{1, 0, 0, 0, −1, 0, 0, 0}+V×{0, 0, 1, 0, 0, 0, −1, 0}. The sixth intermediate signal 252 is formed by adding the quantized luminance signal, the second intermediate signal 241, and the fourth intermediate signal 244. The sixth intermediate signal 252 is equal to Y+U×{0, ½, 0, −½, 0, −½, 0, ½}+V×{0, ½, 0, ½, 0, −½, 0, −½}.

Figure 5A:
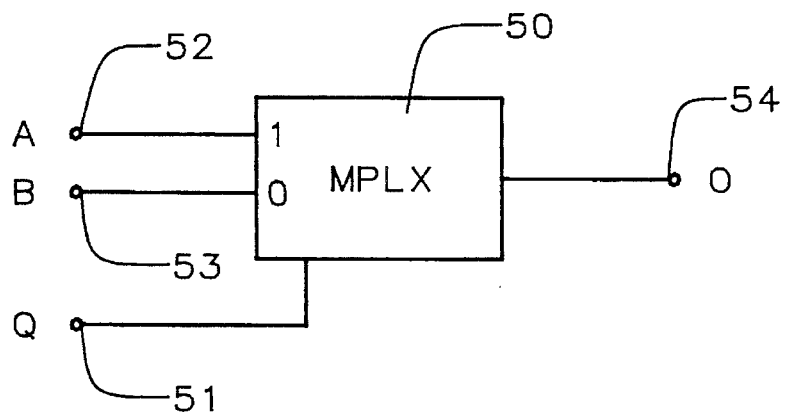
FIG. 5A is the block diagram of the digital multiplexer.
Figure 5B:
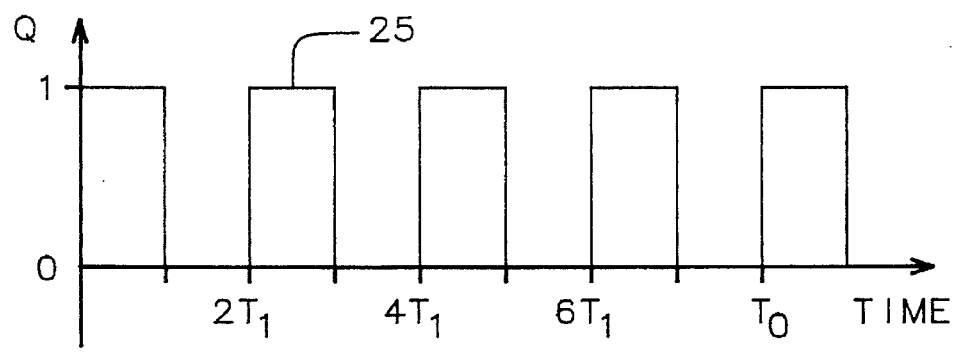
FIG. 5B is the waveform of the control signal for the digital multiplexer.
Figure 5C:
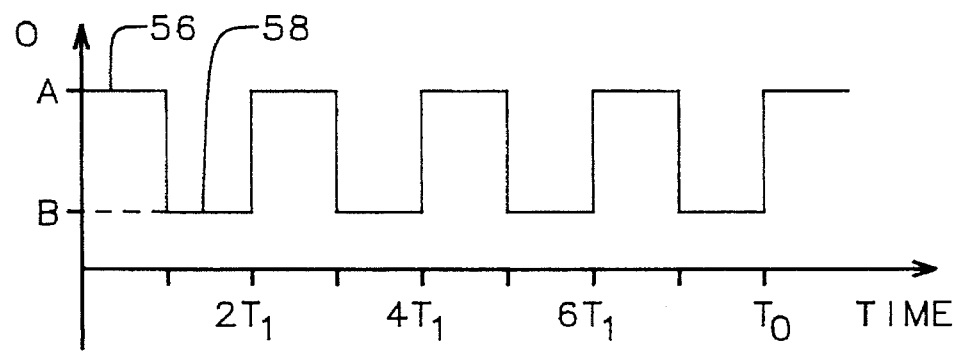
FIG. 5C is the waveform of the output signal of the digital multiplexer.

Next, as shown in FIG. 2A, the digital multiplexer 228 is used to select the fifth intermediate signal 250 during the first, third, fifth, and seventh sample period of each carrier period and the sixth intermediate signal 252 during the second, fourth, sixth, and eighth sample period of each carrier period to form the digital color signal 254. The operation of the digital multiplexer is shown in FIG. 5A, FIG. 5B, and FIG. 5C. The output 54 of the digital multiplexer 50 is equal to the first digital multiplexer input 52 when the control input 51 is logical 1 and to the second multiplexer input 53 when the control input 51 is logical 0. Referring again to FIG. 2A, the digital color signal 254 is equal to Y+U×{1, ½, 0, −½, −1, −½, 0, ½}+V×{0, ½, 1, ½, 0, −½, −1, −½}.

Figure 1:
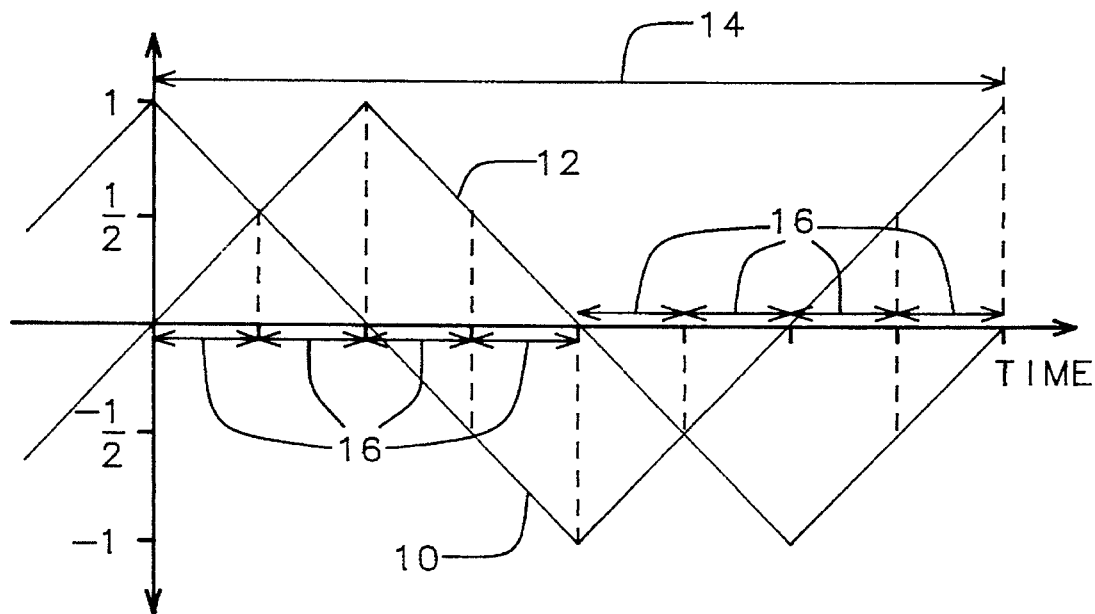
FIG. 1 shows the waveform of the triangular waves $g_1(t)$ and $g_2(t)$.
Figure 9:
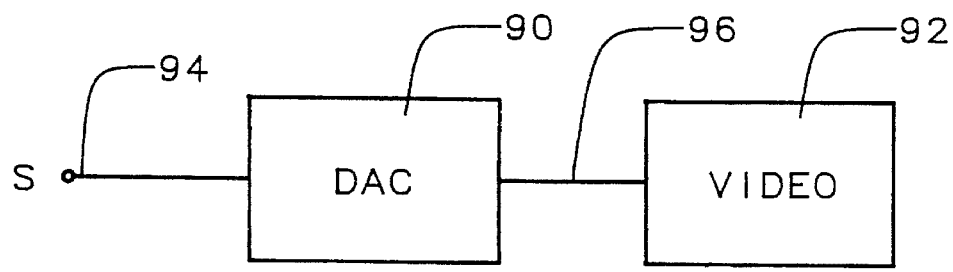
FIG. 9 is the block diagram of the digital to analog converter and video circuits.

Refer now to FIG. 1 which shows two triangular waveforms $g_1(t)$ 10 and $g_2(t)$ 12, each waveform having a period 14 equal to the carrier period $T_o$ and varying between the extreme values of 1 and −1. The first triangular waveform $g_1(t)$ varies from a value of 1 at t=0, to ½ at t= $T_o/8$, to 0 at t=$T_o/4$, to −½ at t=$3T_o/8$, to −1 at t= $T_o/2$, to −½ at t=$5T_o/8$, to 0 at t=$3T_o/4$, to ½ at t=$7T_o/8$, and back to 1 at t=$T_o$. The second triangular waveform $g_2(t)$ varies from a value of 0 at t=0, to ½ at t=$T_o/8$, to 1 at t=$T_o/4$, to ½ at t=$3T_o/8$, to 0 at t=$T_o/2$, to −½ at t=$5T_o/8$, to −1 at t=$3T_o/4$, to −½ at t=$7T_o/8$, and back to 0 at t=$T_o$. It can be seen from the above that the digital color signal of this embodiment is the same as if the signal formed by E(t)=Y+U×$g_1(t)$+ V×$g_2(t)$ were sampled at the sampling frequency. If the digital color signal of this embodiment is processed by a digital to analog converter as shown in FIG. 9 the desired video signal of E(t)=Y+U cos($2\pi f_o t$)+ V sin($2\pi f_o t$) will be obtained.

Refer now to FIGS. 5A through FIG. 8, there is shown another embodiment of this invention. The block diagram of this embodiment is shown in FIG. 6A. The luminance signal, Y, the first color difference signal, U, and the second color difference signal, V, are formed as described in the previous embodiment.

As in the previous embodiment, the desired video signal, E(t), is given by the equation E(t)=Y+U cos($2\pi f_o t$)+V sin($2\pi f_o t$). In this equation $f_o$ is the chrominance subcarrier frequency and is about 3.579545 MHz. A carrier period, $T_o$, is defined to be $1/f_o$. In this embodiment, as in the previous embodiment, the luminance signal, the first color difference signal, and the second color difference signal are sampled at a sampling frequency $f_1$ and quantized. The sampling frequency is eight times the carrier frequency. A sampling period, $T_1$, is defined to be $1/f_1$. Each carrier period is made up of eight sampling periods.

Figure 6A:
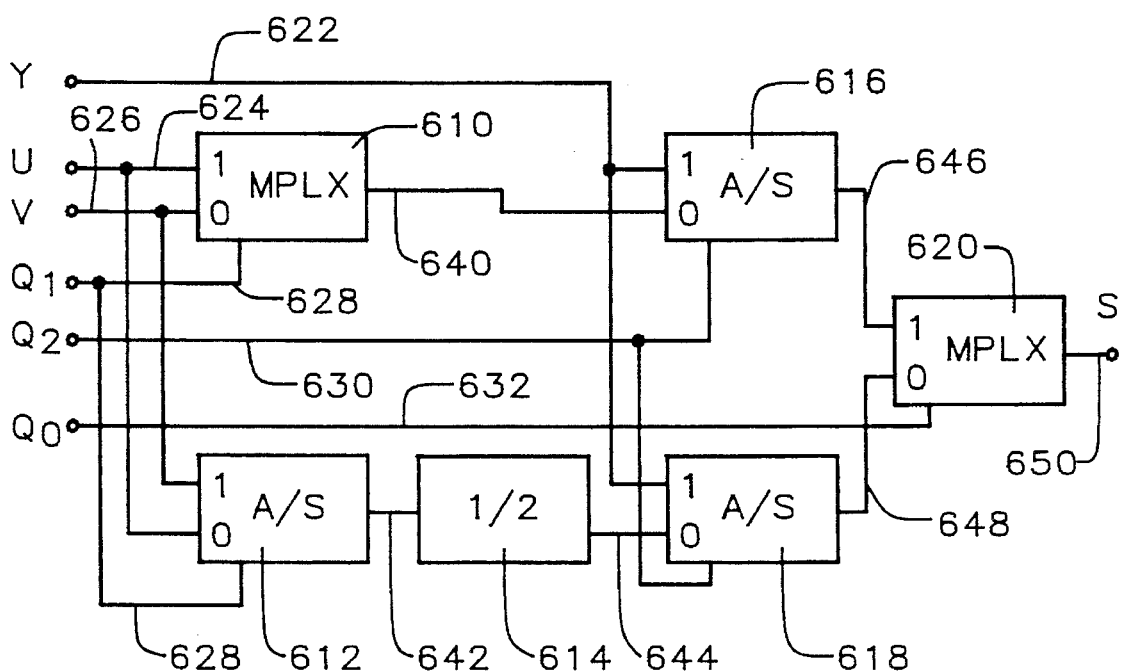
FIG. 6A is the block diagram of the second digital color encoder.
Figure 7A:
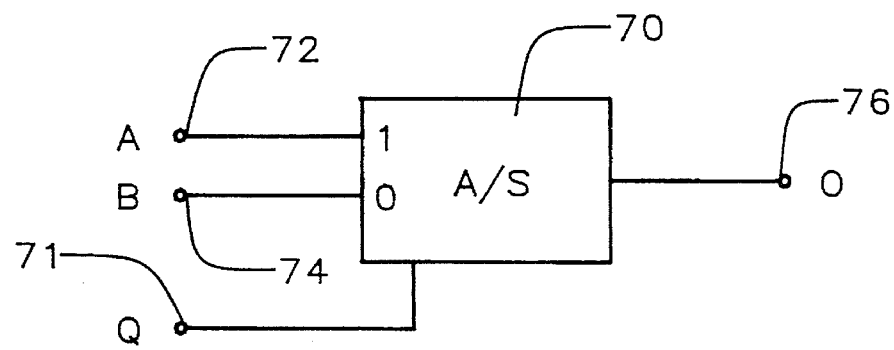
FIG. 7A is the block diagram of the digital addition/ subtraction circuit.
Figure 7B:
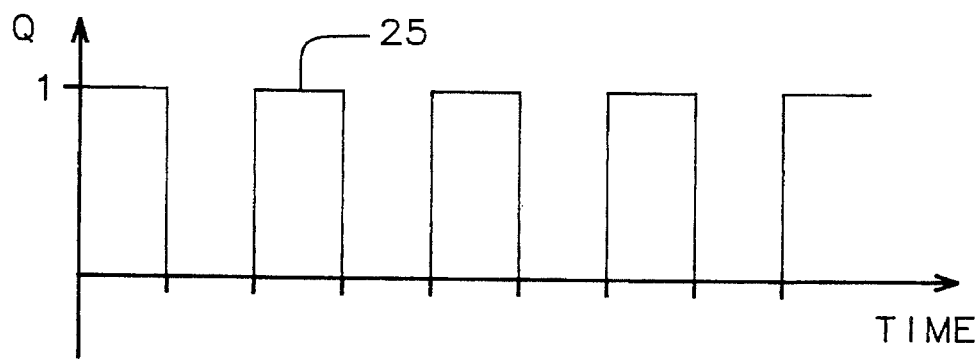
FIG. 7B is the waveform of the control signal for the digital addition/subtraction circuit.
Figure 7C:
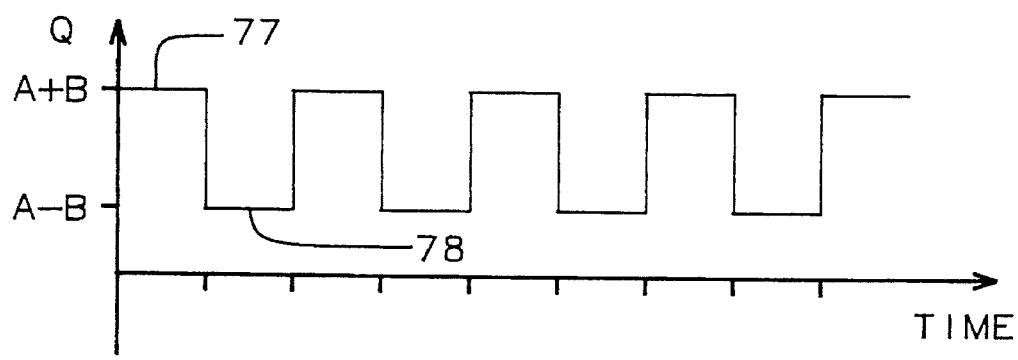
FIG. 7C is the waveform of the output signal of the digital addition/subtraction circuit.
Figure 8:
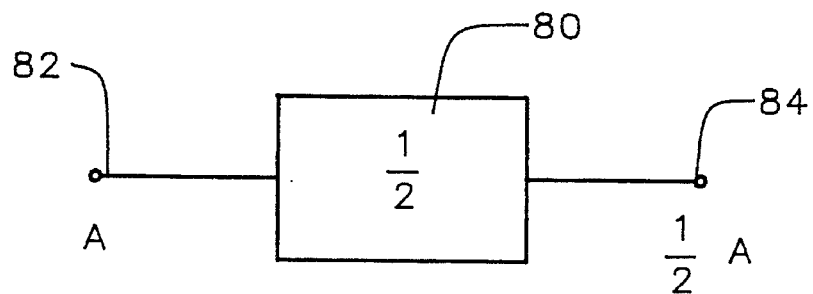
FIG. 8 is the block diagram of the digital one half shifter circuit.

In the block diagram of FIG. 6A digital multiplexers 610 and 620; digital addition/subtraction circuits 612, 616, and 618; and digital ½ shifter circuits 614 are required. The operation of the digital multiplexers, shown in FIG. 5A, FIG. 5B, and FIG. 5C is the same as described in the previous embodiment. The operation of the digital addition/subtraction circuit is shown in FIG. 7A, FIG. 7B, and FIG. 7C. As shown in FIG. 7A, the digital addition/subtraction circuit 70 has a first signal input 72, a second signal input 74, a control input 71, and an output 76. The control input waveform 25 is shown in FIG. 7B. When the control input 71 has a value of logical 1 the output 76 is the sum of the first signal input 72 and the second signal input 74. When the control input 71 has a value of logical 0 the output 76 is the second signal input 74 subtracted from the first signal input 72. The output signal waveform is shown in FIG. 7C, having the value A+B, 77, when the control input is at logical 1 and A−B, 78, when the control input is at logical 0. The operation of the digital ½ shifter circuit is shown in FIG. 8. The output 84 of the digital ½ shifter circuit 80 is equal to ½ the input 82.

Figure 6B:
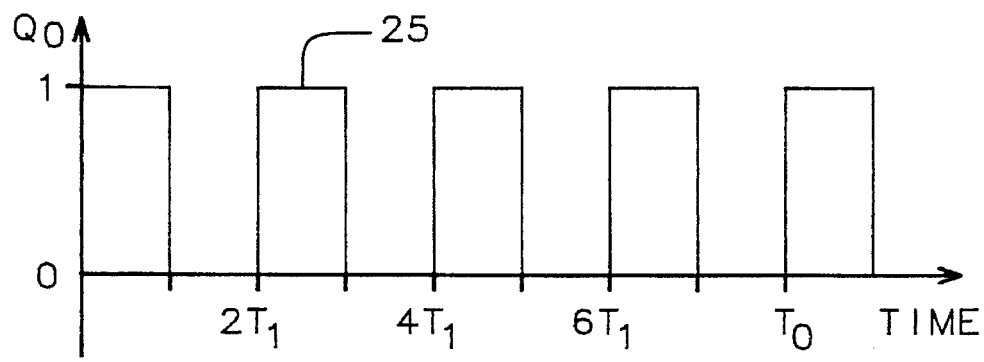
FIG. 6B is the waveform of the first control signal of the second digital color encoder.
Figure 6C:
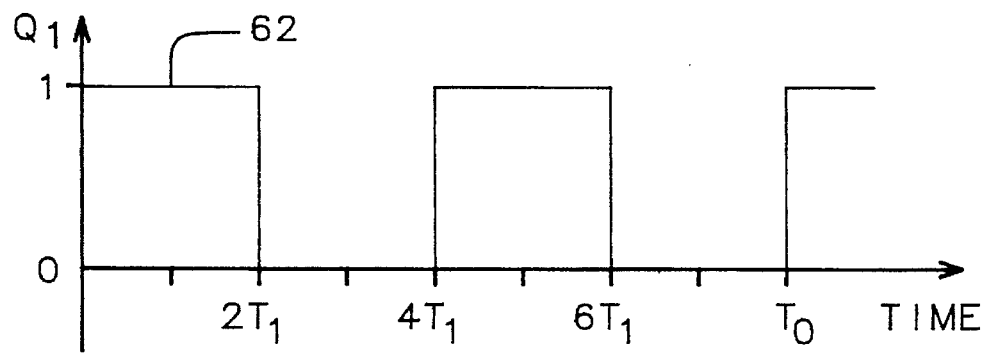
FIG. 6C is the waveform of the second control signal of the digital color encoder.
Figure 6D:
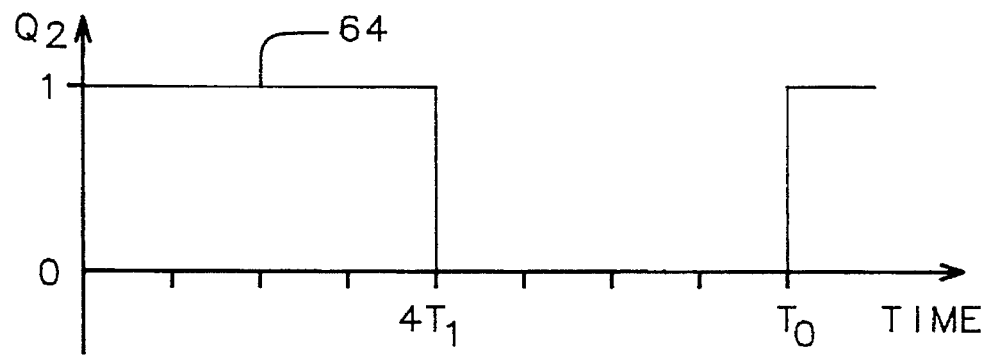
FIG. 6D is the waveform of the third control signal of the second digital color encoder.

Refer now to FIG. 6A, FIG. 6B, FIG. 6C, and FIG. 6D. The control input 628 to the first digital multiplexer 610 and the first digital addition/subtraction circuit 612, shown in FIG. 6C, is a logical 1 for the first, second, fifth, and sixth sampling period of each carrier period and a logical 0 for the third, fourth, seventh, and eighth sampling period of each carrier period. The control input 630 to the second digital addition/subtraction circuit 616 and third digital addition/subtraction circuit 618, shown in FIG. 6D, is a logical 1 for the first, second, third, and fourth sampling period of each carrier period and a logical 0 for the fifth, sixth, seventh, and eighth sampling period of each carrier period. The control input 632 to the second digital multiplexer 620, shown in FIG. 6B, is a logical 1 during the first, third, fifth, and seventh sampling period of each carrier period and a logical 0 during the second, fourth, sixth, and eighth sampling period of each carrier period.

As shown in FIG. 6A, the quantized first color difference signal 624 is the first input to the first digital multiplexer 610 and the second input to the first digital addition/subtraction circuit 612. The first intermediate signal 640 is the output of the first digital multiplexer 610 and is equal to U×{1, 1, 0, 0, 1, 1, 0, 0}+V×{0, 0, 1, 1, 0, 0, 1, 1}, where the above expressions for describing the first intermediate signal are as described in the first embodiment. The second intermediate signal 644 is the output of the digital ½ shifter circuit 614 the input of which is the output 642 of the first digital addition/subtraction circuit 612. The second intermediate signal 644 is equal to U×{½, ½, −½, −½, ½, ½, ½, −½}+V×{½, ½, ½, ½, ½, ½, ½, ½}. The first input of the second digital addition/subtraction circuit 616 and the first input of the third digital addition/subtraction circuit 618 is the quantized luminance signal 622. The second input of the second digital addition/subtraction circuit 616 is the first intermediate signal 640. The second input of the third digital addition/ subtraction circuit 618 is the second intermediate signal 644. The third intermediate signal 646 is the output of the second digital addition/subtraction circuit 616 and is equal to Y+U×{1, 1, 0, 0, −1, −1, 0, 0}+V×{0, 0, 1, 1, 0, 0, −1, −1}. The fourth intermediate signal 648 is the output of the third digital addition/subtraction circuit 618 and is equal to Y+U×{½, ½, −½, −½, −½, −½, ½, ½}+ V×{½, ½, ½, ½, −½, −½, −½, −½}. The first input to the second digital multiplexer 620 is the third intermediate signal 646. The second input to the second digital multiplexer 620 is the fourth intermediate signal 648. The output of the second digital multiplexer 620 is the digital color signal 650 and is given by Y+U×{1, ½, 0, −½, −1, −½, 0, ½}+V×{0, ½, 1, ½, 0, −½, −1, −½ }.

Refer now to FIG. 1 which shows two triangular waveforms $g_1(t)$ 10 and $g_2(t)$ 12, each waveform having a period 14 equal to the carrier period $T_o$ and varying between the extreme values of 1 and −1. The first triangular waveform $g_1(t)$ varies from a value of 1 at t=0, to ½ at t= $T_o/8$, to 0 at t=$T_o/4$, to −½ at t=$3T_o/8$, to −1 at t= $T_o/2$, to −½ at t=$5T_o/8$, to 0 at t=$3T_o/4$, to ½ at t=$7T_o/8$, and back to 1 at t=$T_o$. The second triangular waveform $g_2(t)$ varies from a value of 0 at t=0, to ½ at t=$T_o/8$, to 1 at t=$T_o/4$, to ½ at t=$3T_o/8$, to 0 at t=$T_o/2$, to −½ at t=$5T_o/8$, to −1 at t=$3T_o/4$, to −½ at t=$7T_o/8$, and back to 0 at t=$T_o$. It can be seen from the above that the digital color signal of this second embodiment is the same as if the signal formed by E(t)=Y+U×$g_1(t)$+V×$g_2(t)$ were sampled at the sampling frequency. If the digital color signal of this embodiment is processed by a digital to analog converter as shown in FIG. 9 the desired video signal of E(t)=Y+U cos($2\pi f_o t$)+ V sin($2\pi f_o t$) will be obtained.

While the invention has been particularly shown and described with reference to the preferred embodiments thereof, it will be understood by those skilled in the art that various changes in form and details may be made without departing from the spirit and scope of the invention.

What is claimed is:

1. A digital color encoder, comprising:

red, green, and blue primary color signals having a carrier frequency;

a luminance signal wherein said luminance signal is equal to 0.299 multiplied by said red primary color signal plus 0.587 multiplied by said green primary color signal plus 0.114 multiplied by said blue primary color signal;

means for producing a first color difference signal from said luminance signal and said red primary color signal wherein said first color difference signal is equal to said luminance signal divided by 1.14 subtracted from said red primary color signal divided by 1.14;

means for producing a second color difference signal from said luminance signal and said blue primary color signal wherein said second color difference signal is equal to said luminance signal divided by 2.03 subtracted from said blue primary color signal divided by 2.03;

a sampling frequency equal to eight times said carrier frequency;

a sampling period equal to the inverse of said sampling frequency;

a carrier period equal to the inverse of said carrier frequency wherein each said carrier period contains eight said sampling periods;

a control signal wherein said control signal is equal to a logical 1 during the first, third, fifth, and seventh sampling period of each said carrier period and a logical 0 during the second, fourth, sixth, and eighth sampling period of each said carrier period;

an inverse control signal wherein said inverse control signal is equal to a logical 0 during the first, third, fifth, and seventh sampling period of each said carrier period and a logical 1 during the second, fourth, sixth, and eighth sampling period of each said carrier period;

means for sampling said luminance signal, said first color difference signal, and said second color difference signal at said sampling frequency thereby producing quantized levels of said luminance signal, said first color difference signal and said second color difference signal for each said sampling period;

means for producing a first intermediate signal wherein said first intermediate signal is equal to said quantized first color difference signal during the first sampling period of each said carrier period, zero during the second, third, and fourth sampling periods of each said carrier period, said quantized first color difference signal multiplied by minus one during the fifth sampling period of each said carrier period, and zero during the sixth, seventh, and eighth sampling periods of each said carrier period;

means for producing a second intermediate signal wherein said second intermediate signal is equal to said quantized first color difference signal multiplied by one half during the second and eighth sampling periods of each said carrier period, said quantized first color difference signal multiplied by minus one half during the fourth and sixth sampling periods of each said carrier period, and zero during the first, third, fifth, and seventh sampling periods of each said carrier period;

means for producing a third intermediate signal wherein said third intermediate signal is equal to zero during the first, second, fourth, fifth, sixth, and eighth sampling periods of each said carrier period, said quantized second color difference signal during the third sampling period of each said carrier period, and said quantized second color difference signal multiplied by minus one during the seventh sampling period of each said carrier period;

means for producing a fourth intermediate signal wherein said fourth intermediate signal is equal to said quantized second color difference signal multiplied by one half during the second and fourth sampling periods of each said carrier period, said quantized second color difference signal multiplied by minus one half during the sixth and eighth sampling periods of each said carrier period, and zero during the first, third, fifth, and seventh sampling periods of each said carrier period;

means for producing a fifth intermediate signal wherein said fifth intermediate signal is equal to the sum of said quantized luminance signal, said first intermediate signal and said third intermediate signal;

means for producing a sixth intermediate signal wherein said sixth intermediate signal is equal to the sum of said quantized luminance signal, said second intermediate signal and said fourth intermediate signal; and means for producing a digitized color signal wherein said digitized color signal is equal to said fifth intermediate signal during the first, third, fifth, and seventh sampling period of each said carrier period and said sixth intermediate signal during the second, fourth, sixth, and eighth sampling period of each said carrier period.

2. The digital color encoder of claim 1 wherein said means for producing said first intermediate signal is a first digital modulator circuit having a signal input, a timing input, and an output wherein said signal input of said first digital modulator circuit is connected to said quantized first color difference signal, said timing input of said first digital modulator circuit is connected to said control signal, and said output of said first digital modulator circuit is equal to said quantized first color difference signal during the first sampling period of each said carrier period zero during the second, third, and fourth, sampling periods of each said carrier period, said quantized first color difference signal multiplied by minus one during the fifth sampling period of each said carrier period, and zero during the sixth, seventh, and eighth sampling periods of each said carrier period.

3. The digital color encoder of claim 1 wherein said means for producing said second intermediate signal is a second digital modulator circuit having a signal input, a timing input, and an output wherein said signal input of said second digital modulator circuit is connected to said quantized first color difference signal, said timing input of said second digital modulator circuit is connected to said inverse control signal, and said output of said second digital modulator circuit is equal to said quantized first color difference signal multiplied by one half during the second and eighth sampling periods of each said carrier period, said quantized first color difference signal multiplied by minus. One half during the fourth and sixth sampling periods of each said carrier period, and zero during the first, third, fifth, and seventh sampling periods of each said carrier period.

4. The digital color encoder of claim 1 wherein said means for producing said third intermediate signal is a third digital modulator circuit having a signal input, a timing input, and an output wherein said signal input of said third digital modulator circuit is connected to said quantized second color difference signal, said timing input of said third digital modulator circuit is connected to said control signal, and said output of said third digital modulator circuit is equal to zero during the first, second, fourth, fifth, sixth, and eighth sampling periods of each said carrier period, said quantized second color difference signal during the third sampling period of each said carrier period, and said quantized second color difference signal multiplied by minus one during the seventh sampling period of each said carrier period.

5. The digital color encoder of claim 1 wherein said means for producing said fourth intermediate signal is a fourth digital modulator circuit having a signal input, a timing input, and an output wherein said signal input of said fourth digital modulator circuit is connected to said quantized second color difference signal, said timing input of said fourth digital modulator circuit is connected to said inverse control signal, and said output of said fourth digital modulator circuit is equal to said quantized second color difference signal multiplied by one half during the second and fourth sampling periods of each said carrier period, said quantized second color difference signal multiplied by minus one half during the sixth and eighth sampling periods of each said carrier period, and zero during the first, third, fifth, and seventh sampling periods of each said carrier period.

6. The digital color encoder of claim 1 wherein said means of producing said fifth intermediate signal comprises a first digital adder circuit having a first input, a second input, and an output and a second digital adder circuit having a first input, a second input, and an output wherein said first input of said first digital adder circuit is connected to said first intermediate signal, said second input of said first digital adder circuit is connected to said third intermediate signal, said output of said first digital adder circuit is connected to said first input of said second digital adder circuit, said second input of said second digital adder circuit is connected to said quantized luminance signal, and said output of said second digital adder circuit is said fifth intermediate signal.

7. The digital color encoder of claim 1 wherein said means of producing said sixth intermediate signal comprises a third digital adder circuit having a first input, second input, and an output and a fourth digital adder circuit having a first input, a second input, and an output wherein said first input of said third digital adder circuit is connected to said second intermediate signal, said second input of said third digital adder circuit is connected to said fourth intermediate signal, said output of said third digital adder circuit is connected to said second input of said fourth digital adder circuit,: said first input of said fourth digital adder circuit is connected to said quantized luminance signal, and said output of said fourth digital adder circuit is said sixth intermediate signal.

8. The digital color encoder of claim 1 wherein said means of producing said digitized color signal comprises a digital multiplexer having a first input, a second input, a timing input, and an output wherein said first input of said digital multiplexer is connected to said fifth intermediate signal, said second input of said digital multiplexer is connected to said sixth intermediate signal, said timing input is connected to said control signal, and said output of said digital multiplexer is said digitized color signal and is equal to said fifth intermediate signal during the first, third, fifth, and seventh sampling period of each said carrier period and said sixth intermediate signal during the second, fourth, sixth, and eighth sampling period of each said carrier period.

9. A digital color encoder, comprising:

red, green, and blue primary color signals having a carrier frequency;

a luminance signal wherein said luminance signal is equal to 0.299 multiplied by said red primary color signal plus 0.587 multiplied by said green primary color signal plus 0.114 multiplied by said blue primary color signal;

means for producing a first color difference signal from said luminance signal and said red primary color signal wherein said first color difference signal is equal to said luminance signal divided by 1.14 subtracted from said red primary color signal divided by 1.14;

means for producing a second color difference signal from said luminance signal and said blue primary color signal wherein said second color difference signal is equal to said luminance signal divided by 2.03 subtracted from said blue primary color signal divided by 2.03;

a sampling frequency equal to eight times said carrier frequency;

a sampling period equal to the inverse of said sampling frequency;

a carrier period equal to the inverse of said carrier frequency wherein each said carrier period contains eight said sampling periods;

a first control signal wherein said first control signal is equal to a logical during the first, third, fifth, and seventh sampling periods of each said carrier period and a logical 0 during the second, fourth, sixth, and eighth sampling periods of each said carrier period:

a second control signal wherein said second control signal is equal to a logical 1 during the first, second, fifth, and sixth sampling periods of each said carrier period and a logical 0 during the third, fourth, seventh, and eighth sampling periods of each said carrier period;

a third control signal wherein said third control signal is equal to a logical 1 during the first, second, third, and fourth sampling periods of each said carrier period and a logical 0 during the fifth, sixth, seventh, and eighth sampling periods of each said carrier period;

means for sampling said luminance signal, said first color difference signal, and said second color difference signal at said sampling frequency thereby producing quantized levels of said luminance signal, said first color difference signal and said second color difference signal for each said sampling period;

means for producing a first intermediate signal wherein said first intermediate signal is equal to said quantized first color difference signal during the first, second, fifth and sixth sampling periods of each said carrier period and said quantized second color difference signal during the third, fourth, seventh, and eighth sampling period of each said carrier period;

means for producing a second intermediate signal wherein said second intermediate signal is equal to said quantized first color difference signal multiplied by one half added to said quantized second color difference signal multiplied by one half during the first, second, fifth, and sixth sampling periods of each said carrier period and said quantized first color difference signal multiplied by one half subtracted from said quantized second color signal multiplied by one half during the third, fourth, seventh, and eighth sampling periods of each said carrier period;

means for producing a third intermediate signal wherein said third intermediate signal is equal to said first intermediate signal added to said quantized luminance signal during the first, second, third, and fourth sampling periods of each said carrier period and said first intermediate signal subtracted from said quantized luminance signal during fifth, sixth, seventh and eighth sampling periods of each said carrier period;

means for producing a fourth intermediate signal wherein said fourth intermediate signal is equal to said second intermediate signal added to said quantized luminance signal during the first, second, third, and fourth sampling periods of each said carrier period and said second intermediate signal subtracted from said quantized luminance signal during the fifth, sixth, seventh and eighth sampling periods of each said carrier period; and means for producing a digitized color signal wherein said digitized color signal is equal to said third intermediate signal during the first, third, fifth, and seventh sampling periods of each said carrier period and said fourth intermediate signal during the second, fourth, sixth, and eighth sampling periods of each said carrier period.

10. The digital color encoder of claim 9 wherein said means of producing said first intermediate signal comprises a first digital multiplexer having a first input, a second input, a timing input, and an output wherein said first input of said first digital multiplexer is connected to said quantized first color difference signal, said second input of said first digital multiplexer is connected to said quantized second color difference signal, said timing input of said first digital multiplexer is connected to said first control signal, and said output of said first digital multiplexer is said first intermediate signal.

11. The digital color encoder of claim 9 wherein said means for producing said second intermediate signal comprises a first digital addition/subtraction circuit having a first input, a second input, a timing input, and an output and a digital one half shifter circuit having an input and an output wherein said first input of said first digital addition/subtraction circuit is connected to said quantized second color difference signal, said second input of said first digital addition/subtraction circuit is connected to said quantized first color difference signal, said timing input of said first digital addition/subtraction circuit is connected to said first control signal, said output of said first digital addition/subtraction circuit is connected to said input of said one half shifter circuit, and said output of said one half shifter circuit is said second intermediate signal.

12. The digital color encoder of claim 9 wherein said means for producing said third intermediate signal comprises a second digital addition/subtraction circuit having a first input, a second input, a timing input, and an output wherein said first input of said second digital addition/subtraction circuit is connected to said quantized luminance signal, said second input of said second digital addition/subtraction circuit is connected to said first intermediate signal, said timing input of said second digital addition/subtraction circuit is connected to said second control signal, and said output of said second digital addition/subtraction circuit is said third intermediate signal.

13. The digital color encoder of claim 9 wherein said means for producing said fourth intermediate signal comprises a third digital addition/subtraction circuit having a first input, a second input, a timing input, and an output wherein said first input of said third digital addition/subtraction circuit is connected to said quantized luminance signal, said second input of said third digital addition/subtraction circuit is connected to said second intermediate signal, said timing input of said third digital addition/subtraction circuit is connected to said second control signal, and said output of said third digital addition/subtraction circuit is said fourth intermediate signal.

14. The digital color encoder of claim 9 wherein said means of producing said digitized color signal comprises a second digital multiplexer having a first input, a second input, a timing input, and an output wherein said first input of said second digital multiplexer is connected to said third intermediate signal, said second input of said second digital multiplexer is connected to said fourth intermediate signal, said timing input of said second digital multiplexer is connected to said third control signal, and said output of said second digital multiplexer is said digitized color signal and is equal to said third intermediate signal during the first, third, fifth, and seventh sampling periods of each said carrier period and said fourth intermediate signal during the second, fourth, sixth, and eighth sampling periods of each said carrier period.

* * * * *